(12) United States Patent
Nasu et al.

(10) Patent No.: US 7,610,590 B2
(45) Date of Patent: Oct. 27, 2009

(54) OPTICAL DISC APPARATUS

(75) Inventors: Kazumasa Nasu, Osaka (JP); Katsunori Onishi, Osaka (JP); Takayuki Murakami, Osaka (JP); Katsuo Ichinohe, Osaka (JP); Yasuhiro Nishina, Osaka (JP); Shinya Yamaguchi, Osaka (JP); Nobuyuki Okazaki, Osaka (JP); Ryuuji Hayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 567 days.

(21) Appl. No.: 11/593,507

(22) Filed: Nov. 7, 2006

(65) Prior Publication Data

US 2007/0118846 A1 May 24, 2007

(30) Foreign Application Priority Data

Nov. 18, 2005 (JP) .............................. 2005-333724

(51) Int. Cl.
*G11B 17/03* (2006.01)

(52) U.S. Cl. ..................... 720/608; 720/610; 720/661

(58) Field of Classification Search ................. 720/601, 720/603–605, 608–610, 613, 636–638, 657, 720/659, 661, 673; *G11B 17/03*
See application file for complete search history.

(56) References Cited

U.S. PATENT DOCUMENTS

| 6,886,176 | B2 * | 4/2005 | Ariyoshi et al. | ............. | 720/661 |
| 2001/0010674 | A1 * | 8/2001 | Ahn | .......................... | 369/75.2 |
| 2003/0193872 | A1 * | 10/2003 | Kagawa | .................... | 369/75.2 |

FOREIGN PATENT DOCUMENTS

| JP | A-2004-253130 | | 9/2004 |
| JP | A-2005-174427 | | 6/2005 |
| JP | 2006012304 A | * | 1/2006 |

* cited by examiner

*Primary Examiner*—Andrea L Wellington
*Assistant Examiner*—Nathan Danielsen
(74) *Attorney, Agent, or Firm*—Morgan Lewis & Bockius LLP

(57) ABSTRACT

There are provided a disc tray, a traverse unit, and a main chassis unit. The main chassis unit has a main chassis, which has, as observed when the traverse unit is in a stand-by position, a latch portion that engages with a projection portion of a sub rack and a stopper member that restricts the movement of the cam slider. The stopper member has a rotary shaft in the shape of a circular column, a lever portion which the projection portion makes contact, and a lock portion that makes contact with the cam slider and thereby restricts the sliding movement of the cam slider.

4 Claims, 12 Drawing Sheets

OPTICAL DISC APPARATUS

This application is based on Japanese Patent Application No. 2005-333724 filed on Nov. 18, 2005, the contents of which are hereby incorporated by reference.

BACKGROUND OF THE INVENTION

1. Field of the Invention

The present invention relates to an optical disc apparatus that reads information from or writes information to an optical disc.

2. Description of Related Art

Today, optical discs such as CDs (compact discs) and DVDs (digital versatile discs) are widely used as media for recording video, audio, or information. These optical discs are used as recording media on optical disc apparatuses, which record data to an optical disc by irradiating a recording surface thereof with laser light emitted from an optical head and (or) reads data from the optical disc by detecting the light reflected from the recording surface.

In common optical disc apparatuses, an optical disc is placed on a tray (disc tray), and this tray is, by a drive force transmitted thereto from a drive motor, moved back (loaded) into and moved forth (unloaded) out of an exterior housing through a slit-like opening formed in the front panel thereof.

Such an optical disc apparatus includes a main chassis unit, a traverse chassis that is fitted to the main chassis unit so as to be rotatable, and an optical head that is fitted to the traverse chassis so as to be linearly slidable on a reciprocating fashion. The traverse chassis is provided with an optical disc driving mechanism that clamps the optical disc and makes it rotate. As the traverse chassis is moved up and down, the optical disc driving mechanism clamps and unclamps the optical disc placed on the disc tray. As the optical head slides, varying parts of the clamped optical disc, between the inner and outer edges thereof, are irradiated with laser light.

In common optical disc apparatuses, the drive force for loading/unloading the disc tray, the drive force for moving up and down the traverse chassis, and the drive force for making the optical head slide are all supplied from a single drive motor while the destination to which to transmit its drive force is switched with proper timing.

For example, unloading is achieved in the following manner. First the optical head is moved to the inner edge of the optical disc. Then the traverse chassis is moved down so that none of the components (such as the optical head) provided thereon interferes with the unloading of the disc tray. Now the disc tray is moved forth so as to be unloaded.

In the inventions disclosed in JP-A-2005-174427 and JP-A-2004-253130, the switching of the destination of the drive force is achieved by use of a cam slider and a trigger plate. When the optical pickup (optical head) is moved to the inner edge of the optical disc, the trigger plate slides. As the trigger plate moves, it pushes the cam slider and makes it move together. The cam slider is provided with a rack, which then meshes with a gear that transmits the drive force, so that the drive force is now transmitted to the cam slider.

As the cam slider moves, the traverse chassis, which is engaged with the cam slider in a cam groove formed therein, moves down, and the disc tray, which is engaged with the cam slider at another place thereon, also moves. The disc tray is provided with a rack, and thus moves together with the cam slider. Now the rack meshes with a gear and the disc tray is unloaded.

At this point, a boss formed on a slider rack of the optical pickup is engaged with the trigger plate, and thereby restricts the movement of the optical pickup. Loading is achieved through a reversed sequence of the actions described above.

To realize the above-mentioned three kinds of movement with a single motor, the drive motor is fitted to the traverse chassis, and its shaft is fitted with a worm gear.

Inconveniently, however, this conventional construction has the following disadvantages. Since the trigger plate is fitted to the traverse chassis, the trigger plate may occasionally move together with the traverse chassis. Simultaneous movement of the trigger plate and the traverse chassis is likely to produce errors in the timing of the movement of the optical pickup and the cam slider, and therefore it is necessary to prevent the movement of the traverse chassis from hampering the movement of the trigger plate. This accordingly diminishes the flexibility in the design of the traverse chassis, the optical pickup, and the cam slider.

Moreover, the trigger plate does not receive the drive force but simply follows the movement of the optical pickup and (or) the cam slider. This imposes a burden on the movement of the optical pickup and (or) the cam slider, and may lead to lower movement accuracy. Moreover, parts of the optical pickup and the cam slider need to be so formed as to engage with the trigger plate, and need to be given sufficient mechanical strength. This requires extra trouble and time in production.

Furthermore, providing the trigger plate increases the number of components of an optical disc apparatus, and also increases the trouble and time required in assembly, leading to accordingly higher costs in production and assembly.

SUMMARY OF THE INVENTION

In view of the conventionally experienced inconveniences mentioned above, it is an object of the present invention to reduce the production cost of an optical disc apparatus by driving a disc tray, a traverse chassis, and an optical head with a single motor and by eliminating a switching member for switching between the driving of the traverse chassis and the driving of the optical head.

In view of the conventionally experienced inconveniences mentioned above, it is another object of the present invention to switch with accurate timing the transmission of a drive force to a disc tray, a traverse chassis, and an optical head in a construction where the disc tray, the traverse chassis, and the optical head are driven with a single motor without the use of a switching member for switching between the driving of the traverse chassis and the driving of the optical head.

In view of the conventionally experienced inconveniences mentioned above, it is still another object of the present invention to provide an optical disc apparatus in which, as a result of the omission of a member that is driven by following the movement of another member, the burden on the latter arising from its driving the former is reduced and hence the drive force needed for the movement is reduced, and which is thus less prone to failure for a long period.

To achieve the above objects, according to the present invention, an optical disc apparatus is provided with: a main chassis; a disc tray that slides in a reciprocating fashion with respect to the main chassis to admit and eject an optical disc; a traverse chassis that is supported on the main chassis so as to be movable up and down; an optical head that is arranged on the traverse chassis so as to be slidable and that records data to or plays back data from the optical disc by irradiating the optical disc with laser light; and a drive motor that is fixed to the main chassis and that generates a drive force. The optical head slides in a reciprocating fashion between the inner edge and the outer edge of the optical disc, and has a slide rack that receives the drive force of the drive motor, the slide rack having a rack boss that protrudes from the top surface of the slide rack and a projection portion that protrudes from a surface perpendicular to the top surface. The traverse chassis has a slide boss that protrudes from a front surface thereof. The main chassis has a tray gear that transmits the drive force; a cam slider having a cam slider rack that meshes with the tray gear, a cam groove that has a step that engages with the slide boss of the traverse chassis, and a trigger guide that engages with the rack boss of the slide rack, the cam slider sliding in a direction perpendicular to the slide direction of the disc tray; a stopper member having a rotary shaft that is supported to be rotatable and a lever portion and a lock portion that are arranged away from each other in the axial direction of the rotary shaft and that extend in different directions; and a latch portion that protrudes from a bottom part of the main chassis. As the cam slider slides, the slide boss slides along inside the cam groove of the cam slider, so that the traverse chassis moves up and down between a clamping position where the traverse chassis clamps the optical disc admitted by the disc tray and a stand-by position where the traverse chassis does not interfere with sliding movement of the disc tray. When the traverse chassis moves down to the stand-by position, the projection portion of the optical head engages with the latch portion of the main chassis. The stopper member is resiliently biased in such a direction that the lock portion makes contact with the cam slider and, as the optical head slides toward the inner edge side of the optical disc, the lever portion rotates by being pushed by the projection portion, the stopper member moving between a locking position where the lock portion makes contact with a side surface of the cam slider to restrict the sliding movement of the cam slider and an unlocking position where the lock portion leaves the cam slider free to slide.

With this construction, without the use of a member that simply follows the movement of another member, it is possible to switch among "the sliding of the optical head", "the swinging of the traverse chassis", and "the sliding of the disc tray". Moreover, it is possible to select the optimum drive force for each kind of movement, and thereby to reduce energy consumption. Moreover, it is possible to prevent unnecessarily heavy loads from being imposed on the drive motor, the drive force transmission mechanism, and the racks, bosses, and cams provided in the relevant components, and thereby to ensure stable operation for a long period.

Thus, no member is used that simply follows another member for the switching among the above-mentioned three kinds of movement. This helps prevent errors in the timing of movement resulting from the driving of a member that simply follows, and thus ensures that the different kinds of movement are switched with accurate timing. That is, it is possible to prevent contact with another member provided in the optical disc apparatus during the movement of the optical head, the disc tray, and the traverse chassis, and thus it is possible to prevent failure such as breakage of and wear in the member.

The drive force of the drive motor is transmitted by use of flat gears and racks, in other words, without the output shaft of the drive motor being fitted with a worm gear. This helps reduce the transmission loss that arises when the drive force is transmitted from a worm gear to a flat gear. Moreover, since the drive motor is fitted to the main chassis, the drive motor can be arranged with increased flexibility, and the number of flat gears for transmitting the drive force can be reduced accordingly.

In the above construction, the stopper member may be provided with a spring member so as to be resiliently biased by the spring member, or alternatively the center of gravity of the stopper member may be so adjusted that the lock member rotates in such a direction as to make contact with the cam slider.

According to the present invention, it is possible to reduce the production cost of an optical disc apparatus by driving a disc tray, a traverse chassis, and an optical head with a single motor and by eliminating a switching member for switching between the driving of the traverse chassis and the driving of the optical head.

Moreover, according to the present invention, it is possible to switch with accurate timing the transmission of a drive force to a disc tray, a traverse chassis, and an optical head in a construction where the disc tray, the traverse chassis, and the optical head are driven with a single motor without the use of a switching member for switching between the driving of the traverse chassis and the driving of the optical head.

Furthermore, according to the present invention, it is possible to provide an optical disc apparatus in which, as a result of the omission of a member that is driven by following the movement of another member, the burden on the latter arising from its driving the former is reduced and hence the drive force needed for the movement is reduced, and which is thus less prone to failure for a long period.

DETAILED DESCRIPTION OF PREFERRED EMBODIMENTS

Figure 1:
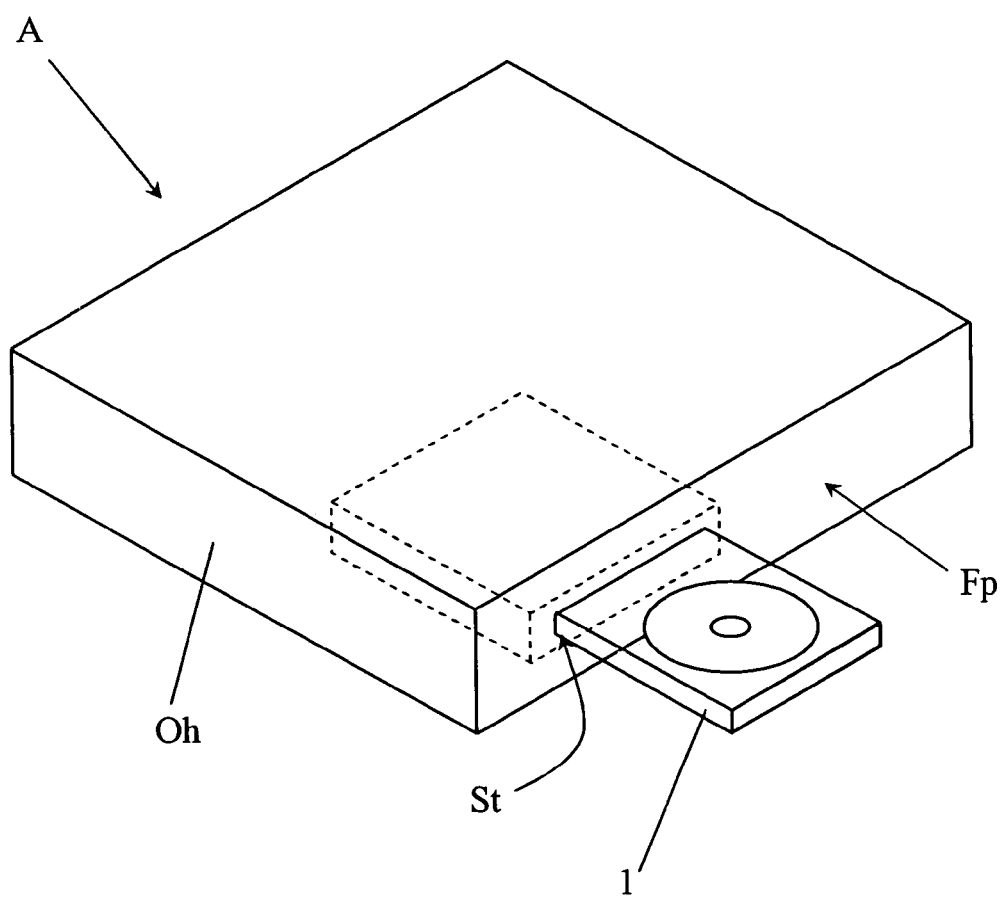
FIG. 1 is a perspective view of an optical disc apparatus embodying the present invention.
Figure 2:
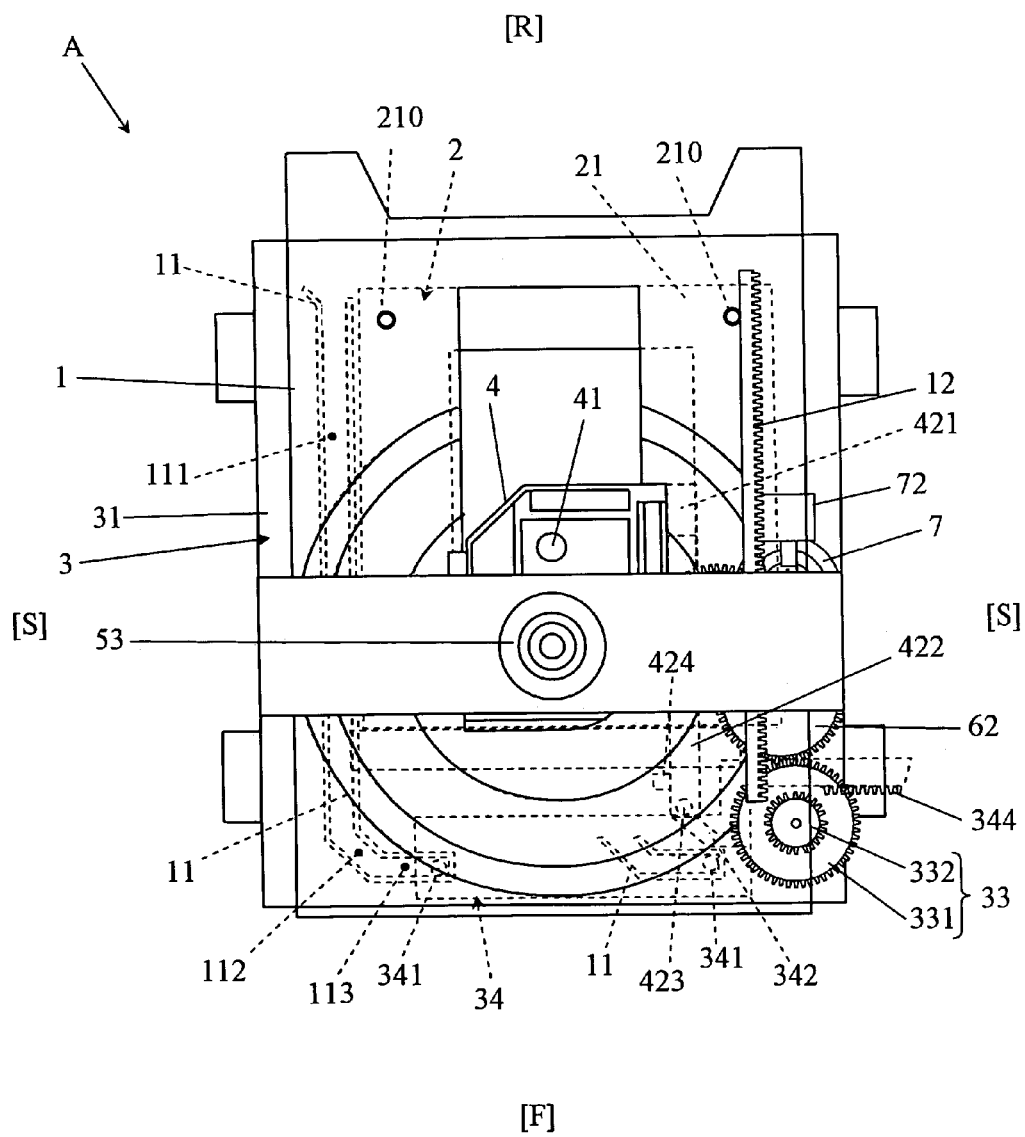
FIG. 2 is a plan view schematically showing the interior of the optical disc apparatus embodying the present invention.
Figure 3:
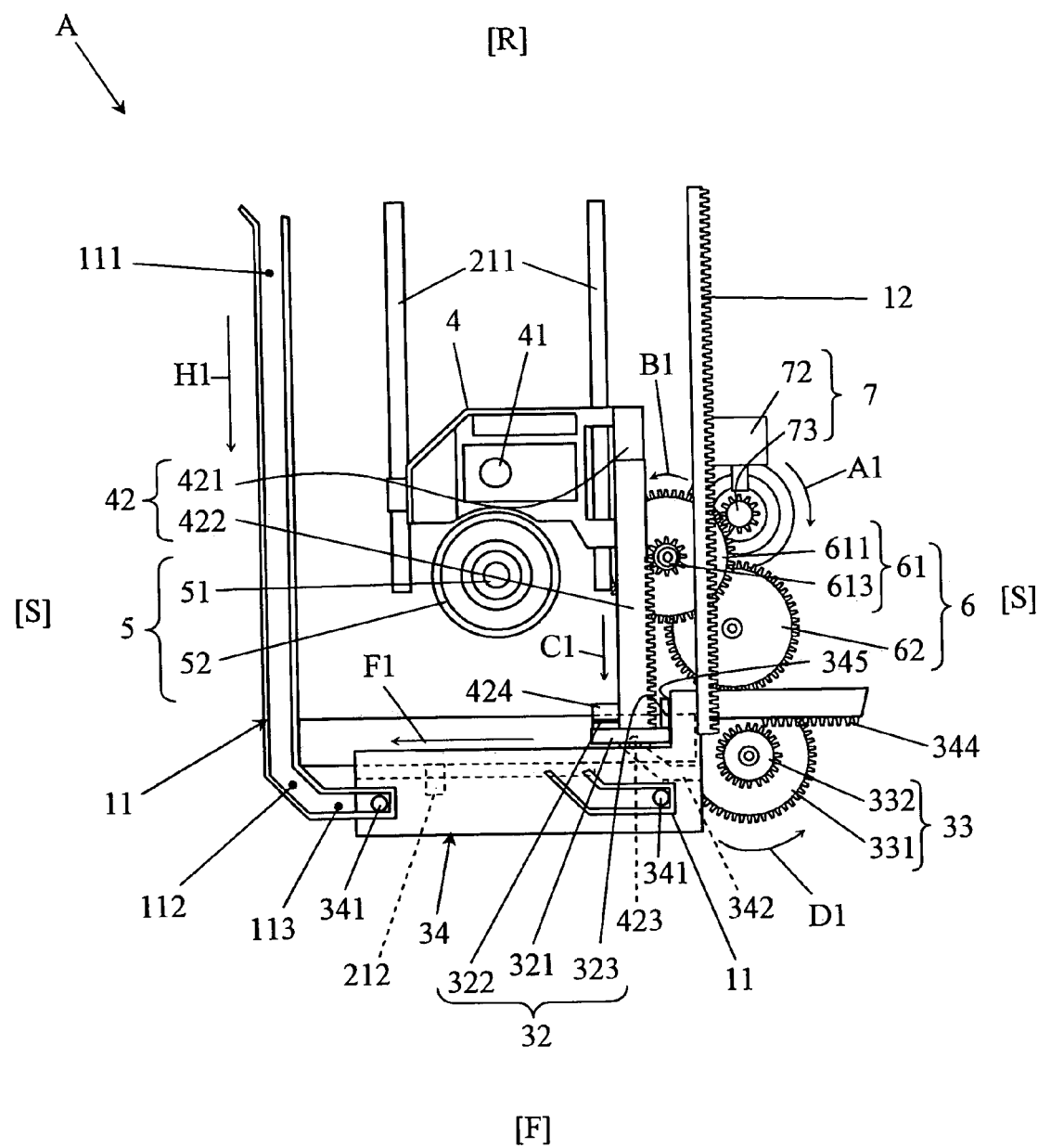
FIG. 3 is a diagram schematically showing the construction of the optical disc apparatus shown in FIG. 2, with its main chassis and disc tray omitted.
Figure 4:
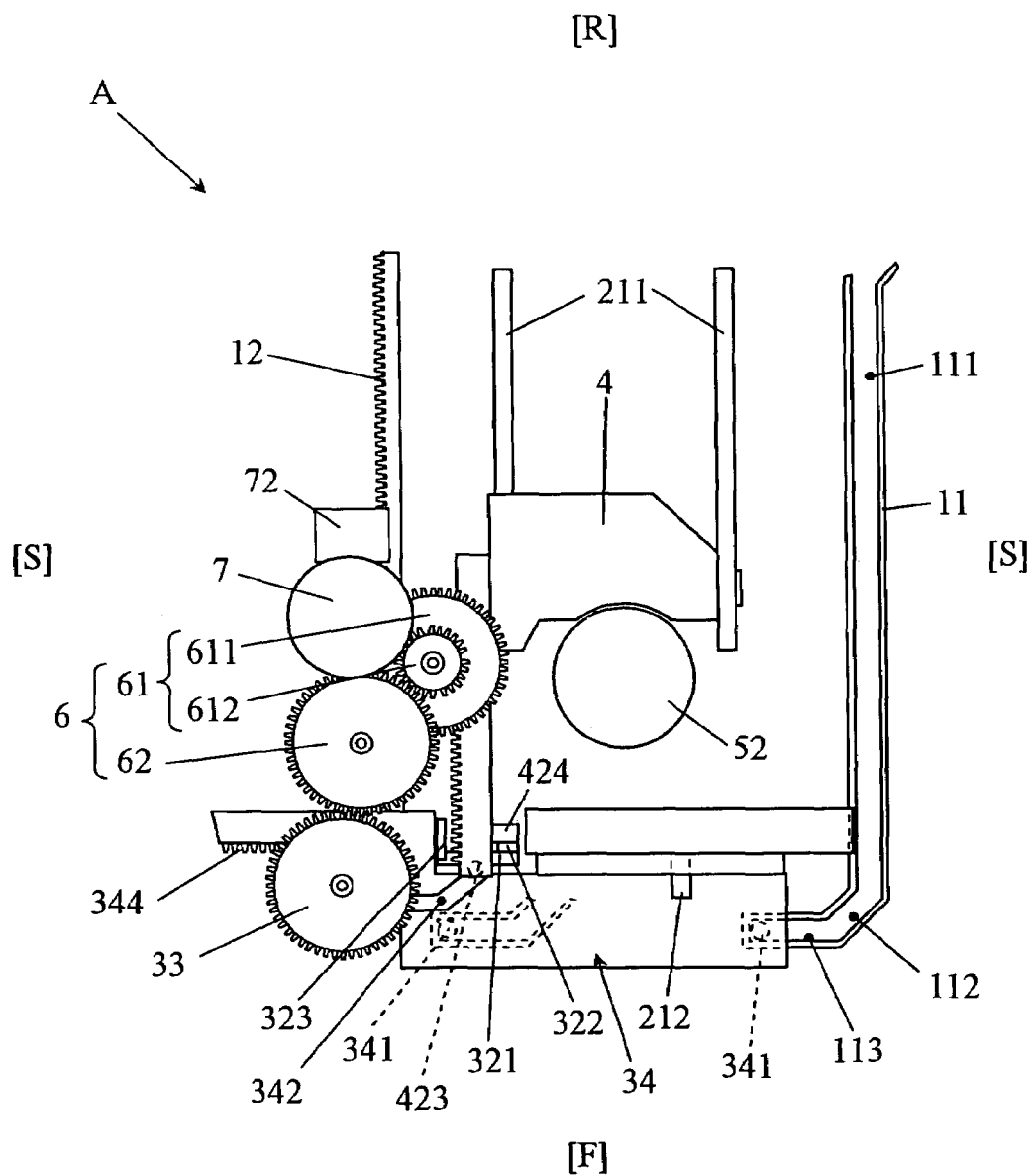
FIG. 4 is a diagram schematically showing the construction of the interior of the optical disc apparatus, as seen from below.
Figure 5:
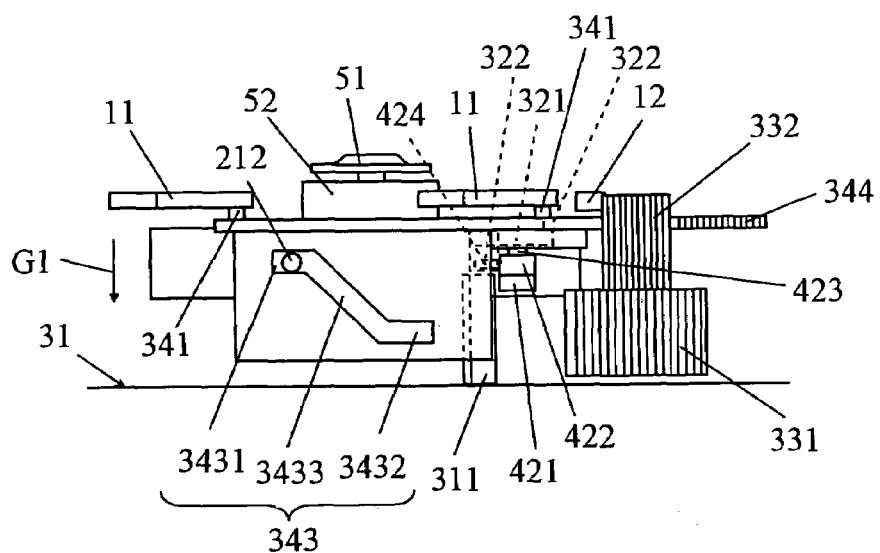
FIG. 5 is a diagram schematically showing the construction of the interior of the optical disc apparatus, as seen from the front panel side.
Figure 6:
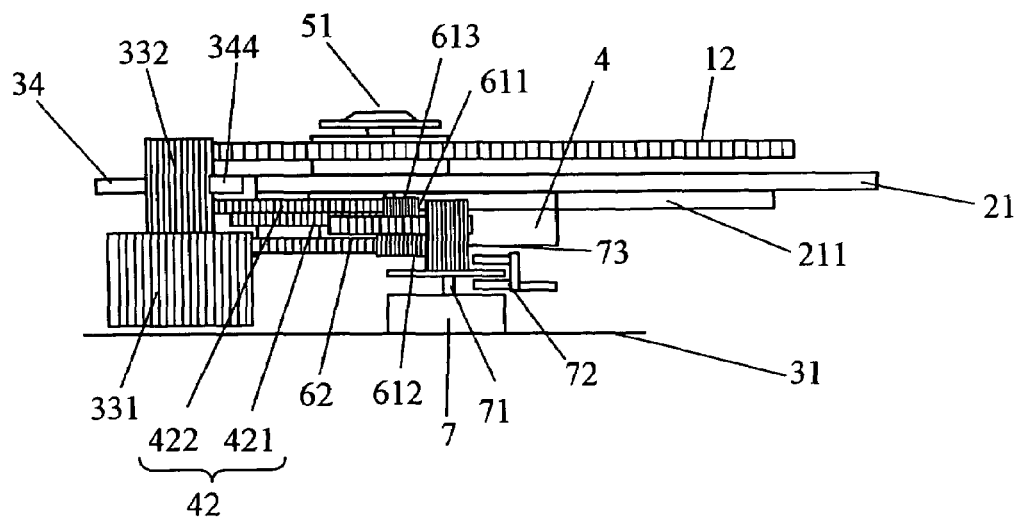
FIG. 6 is a diagram schematically showing the construction of the interior of the optical disc apparatus, as seen from a lateral side.

Hereinafter, an embodiment of the present invention will be described with reference to the accompanying drawings. FIGS. 1 to 6 show an optical disc apparatus embodying the present invention. FIG. 1 is a perspective view of the optical disc apparatus, and FIG. 2 is a diagram schematically showing the construction of the optical disc apparatus as seen from above. FIG. 3 is a diagram schematically showing the construction of the interior of the optical disc apparatus as seen from above, and FIG. 4 is a diagram schematically showing the construction of the interior of the optical disc apparatus as seen from below. FIGS. 5 and 6 are diagrams schematically showing the construction of the interior of the optical disc apparatus shown in FIG. 3 as seen from the front panel side and from a lateral side, respectively. For the sake of convenience, in FIGS. 3 to 6, the disc tray proper is omitted from illustration, and only the guide groove 11 and the tray rack 12 thereof, which will be described later, are shown.

The optical disc apparatus A reads data from and (or) writes data to an optical disc loaded therein by irradiating it with laser light. As shown in FIG. 1, the optical disc apparatus A has a disc tray 1 so arranged that the disc tray 1 can move forth out of and back into an exterior housing Oh through a slit-like opening St formed in a front panel Fp thereof. As shown in FIG. 2, the optical disc apparatus A includes, in addition to the disc tray 1, a traverse unit 2 and a main chassis unit 3.

Disc Tray

With the disc tray 1 moved out of the optical disc apparatus A through the opening St as shown in FIG. 1, an optical disc is placed on the disc tray 1, and then the disc tray 1 is moved back into the optical disc apparatus A. This allows the optical disc to be set (loaded) into the position where data can be retreated therefrom or recorded thereto. On the other hand, moving the disc tray 1 out of the optical disc apparatus A allows the optical disc to be ejected (unloaded).

As shown in FIG. 4, on the bottom surface of the disc tray 1 (unillustrated), there are provided a guide groove 11 that bends stepwise and a tray rack 12 that receives a drive force from a later-described tray gear 33, the guide groove 11 and the tray rack 12 both extending in the length direction of the disc tray 1 (in the up/down direction in FIG. 4). The guide groove 11 has a hook-like shape as seen in a plan view, consisting of a linear portion 111 that runs in the slide direction of the disc tray 1, an oblique portion 112 that runs obliquely at a predetermined place, and a perpendicular portion 113 that runs in a direction perpendicular to the slide direction.

In the following description, the side at which the front panel Fp is provided is referred to as the front side (F), and the side opposite to the front side is referred to as the rear side (R); moreover, a side located in a direction perpendicular to the direction running from the front to the rear side is referred to as a lateral side (S).

Traverse Unit

The traverse unit 2 shown in FIG. 2 has an optical head 4, an optical disc drive mechanism 5, and a drive force transmission mechanism 6, all shown in FIG. 3, fitted on a traverse chassis 21. The traverse chassis 21 is fitted, with screws, at the rear-side end of a main chassis 31.

In the traverse unit 2, in fitting holes (unillustrated) formed in a rear-side part of the traverse chassis 21, floating rubber members (dampers) 210 (see FIG. 2) are fitted that cover the inner circumference surfaces and both axial end parts of those holes and that have openings formed therein through which to fit bosses formed on the main chassis 31. The traverse chassis 21 is mounted with those bosses fitted through the fitting holes, and then the fitting holes of the traverse chassis 21 and the bosses of the main chassis 31 are fastened together with fitting screws.

The fitting screws are fitted and fixed in such a way that a fixed interval is secured between the screw heads and the main chassis 31. This interval is exploited to allow the front-side end of the traverse chassis 21 (traverse unit 2) to pivot (move up and down) about the fitting screws. When data is read from or written to the optical disc, the traverse chassis 21 (traverse unit 2) is moved up so as to hold (clamp) the optical disc (going into a clamping position). On the other hand, when the optical disc is ejected, the traverse chassis 21 is moved down so that the optical disc is placed on the disc tray 1. (going into a stand-by state where the optical disc is located away from a later-described turntable).

The optical head 4 reads data from or records data to the optical disc by irradiating it with laser light. As shown in FIG. 3, the optical head 4 is so fitted that it can slide along guide shafts 211 provided on the traverse chassis 21. The optical head 4 is provided with an objective lens 41 through which it shines laser light on the optical disc. Also arranged on the optical head 4 are, though unillustrated, optical components such as a laser light source that emits laser light and a photo-detective device that receives the laser light reflected from the optical disc and converts it into an electrical signal.

As shown in FIG. 3, the optical head 4 is provided with a rack 42 to which the drive force of a later-described drive motor 7 is transmitted. The rack 42 is composed of a main rack 421 that constitutes the lower part of the rack 42 and that is formed integrally with the optical head 4 and a sub rack (slide rack) 422 that is arranged to overlap the main rack 421 so as to form the upper part of the rack 42. That is, the rack 42 is built as a double rack having the main rack 421 and the sub rack 422 put together (see FIG. 6).

As shown in FIG. 6, the main rack 421 is meshed with a pinion gear portion 613 of a later-described first gear 61. The drive force is transmitted from the pinion gear portion 613 to the main rack 421 to allow the optical head 4 to slide. The sub rack 422 is fitted to the main rack 421 so as to be slidable. The main rack 421 and the sub rack 422 are resiliently biased with a spring (unillustrated) in such a way that, as seen in a plan view, the gear teeth of one deviate from the gear teeth of the other. Resiliently biasing the gear teeth of the main rack 421 and the sub rack 422 to deviate from each other in this way allows the gear teeth of the pinion gear portion 613 to be held tight, and thus helps eliminate the backlash resulting from the play between the gear teeth of the pinion gear portion 613 and those of the main rack 421 and the sub rack 422.

In the rack 42, the gear teeth of the sub rack 422 are formed over a longer distance than those of the main rack 421. The sub rack 422 is arranged to overlap the main rack 421 so that the gear teeth of the former overhang on the rear side of the gear teeth of the latter. This allows switching, according to the position of the optical head 4, among a state in which both the main rack 421 and the sub rack 422 are meshed with the pinion gear portion 613 of the first gear 61, a state in which only the sub rack 422 is meshed with the pinion gear portion 613, and a state in which neither the main rack 421 nor the sub rack 422 is meshed with the pinion gear portion 613.

Moreover, as shown in FIG. 3, at the front-side end of the sub rack 422, a rack boss 423 is provided that engages with a trigger guide 342 of a later-described cam slider 34. At the end of the sub rack 422 at which the rack boss 423 is formed, on the side opposite to the gear teeth, a projection portion 424 is formed that pushes a later-described stopper member 32 fitted to the main chassis 31 and that engages with a latch portion 311 protruding from the main chassis 31 when the traverse unit 2 is in the stand-by position. The rack boss 423 protrudes toward the disc tray 1.

In FIG. 3, when the optical head 4 slides to the inner edge (to the front side) of the optical disc and almost reaches the limit of its movement, the main rack 421 and the pinion gear portion 613 of the first gear 61 unmesh from each other, and the optical head 4 stops sliding. At this point, the sub rack 422 is still meshed with the pinion gear portion 613, and thus the sub rack 422 further slides to the front side, so that the rack boss 423 formed on the sub rack 422 engages with the trigger guide 342 of the cam slider 34.

As shown in FIG. 3, the optical disc drive mechanism 5 includes a turntable 51 for supporting the optical disc, a spindle motor 52 for driving the turntable 51, and a clamp 53 (see FIG. 2) provided on the main chassis unit 3 (see FIG. 2). As will be understood from FIGS. 2, 3, 5, 6, etc. considered together, as the traverse unit 2 is moved up, the turntable 51 holds (clamps) the optical disc between itself and the clamp 53. Here, the clamp 53 is provided with an unillustrated permanent magnet, and the turntable 51 is provided with an unillustrated yoke that receives magnetism, so that the clamp 53 and the turntable 51 magnetically attract each other and thereby firmly hold the optical disc between them. The spindle motor 52 makes the thus clamped optical disc rotate. How the traverse unit 2 having the spindle motor 52 mounted thereon is moved up and down for the clamping of the optical disc (for playback therefrom etc.) will be described later.

As shown in FIGS. 3 and 5, the traverse chassis 21 shown in FIG. 2 has a slide boss 212 that integrally protrudes from the front surface thereof and that engages with a cam groove 343 of the cam slider 34 so that, as the cam slider 34 moves, it makes the traverse chassis 21 move up and down.

As shown in FIGS. 3 and 4, the drive force transmission mechanism 6 includes a first gear 61 and a second gear 62. These gears are both pivoted on the traverse chassis 21 so as to be rotatable. The drive force transmission mechanism 6 transmits the drive force of a later-described drive motor 7 provided on the main chassis unit 3 (see FIG. 2) so that the drive force is used for the reciprocating movement of the disc tray 1 (see FIG. 2), for the reciprocating movement of the optical head 4, and for the movement of the cam slider 34.

As shown in FIGS. 3, 4, and 6, the first gear 61 has a large-gear portion 611 to which the drive force is transmitted from a pinion gear 73 (described later) fitted to an output shaft 71 (described later) of the drive motor 7, a small-gear portion 612 that is provided under (closer to the main chassis 31 than) the large-gear portion 611 and that meshes with the second gear 62, and a pinion gear portion 613 that is provided on top of the large-gear portion 611 to transmit the drive force to the rack 42 of the optical head 4. That is, the large-gear portion 611, located at the center, the small-gear portion 612, located at the bottom, and the pinion gear portion 613, located at the top, are formed integrally so as to share a single center axis. The second gear 62 is for transmitting the drive force from the small-gear portion 612 of the first gear 61 to the tray gear 33, and is pivoted on the traverse chassis 21 (see FIG. 1) so as to be rotatable.

Main Chassis Unit

As shown in FIGS. 2 and 3, the main chassis unit 3 includes a main chassis 31, a tray gear 33, a drive motor 7, and a cam slider 34. The main chassis 31 is a principal chassis that houses the traverse unit 2, and has the drive motor 7 and the cam slider 34 arranged thereon.

As shown in FIG. 6, the tray gear 33 transmits the drive force from the second gear 62 to the tray rack 12 of the disc tray 1 and to a later-described cam slider rack 344 of the cam slider 34, and is pivoted on the main chassis 31 so as to be rotatable. The tray gear 33 has a large-gear portion 331 that meshes with the second gear 62 and a small-gear portion 332 that is formed integrally with the large-gear portion 331 so as to share a single center axis therewith and that meshes selectively with either the tray rack 12 or the cam slider rack 344.

As shown in FIG. 6, the output shaft 71 of the drive motor 7 is fitted with an encoder 72, which yields information (the number of revolutions, the angle of rotation, the speed of rotation, etc.) on the rotation of a pinion gear 73 provided on the output shaft 71.

As shown in FIGS. 3, and 5, the cam slider 34 includes a vertical boss 341 that engages with the guide groove 11 on the bottom surface of the disc tray 1 (see FIG. 2), a trigger guide 342 that engages with the rack boss 423 provided on the sub rack 422 of the optical head 4, a cam groove 343 that engages with the slide boss 212 of the traverse chassis 21, and a cam slider rack 344 that meshes with the tray gear 33.

Figure 7A:
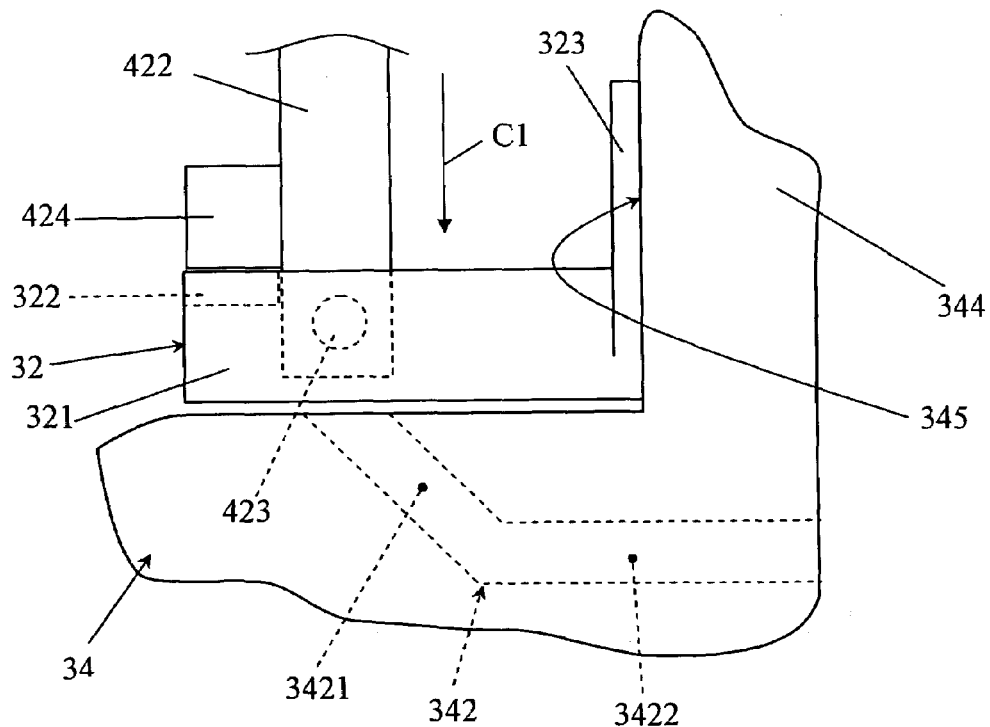
FIG. 7A is an enlarged plan view schematically showing how the sub rack and the cam slider engage with each other.

As shown in FIG. 2, the cam slider 34 is arranged in a front-side part of the main chassis 31, and slides in a direction (lateral direction) perpendicular to the movement direction of the disc tray 1. As shown in FIG. 7A etc., the trigger guide 342 of the cam slider 34 has an oblique portion 3421 that is formed to run obliquely and a lateral portion 3422 that runs laterally. In FIG. 2, when the optical head 4 moves toward the front side to allow the traverse unit 2 to move to the stand-by position, the rack boss 423 of the sub rack 422 engages with the trigger guide 342, and the rack boss 423 pushes the trigger guide 342 to make the cam slider 34 move laterally.

As shown in FIG. 5, the cam groove 343 has an upper cam groove 3431 and a lower cam groove 3432 that are located, when the cam slider 34 has been arranged, in the upward and downward directions of the up/down movement of the traverse chassis 21 and an inclined cam groove 3433 that links the upper cam groove 3431 and the lower cam groove 3432 together. Through the cam groove 343 is placed the slide boss 212 of the traverse chassis 21 (see FIG. 2). Thus, as the slide boss 212 moves to reach the upper cam groove 3431, the traverse chassis 21 (traverse unit 2) moves up, and, as the slide boss 212 moves to reach the lower cam groove 3432, the traverse chassis 21 (traverse unit 2) moves down.

Figure 7B:
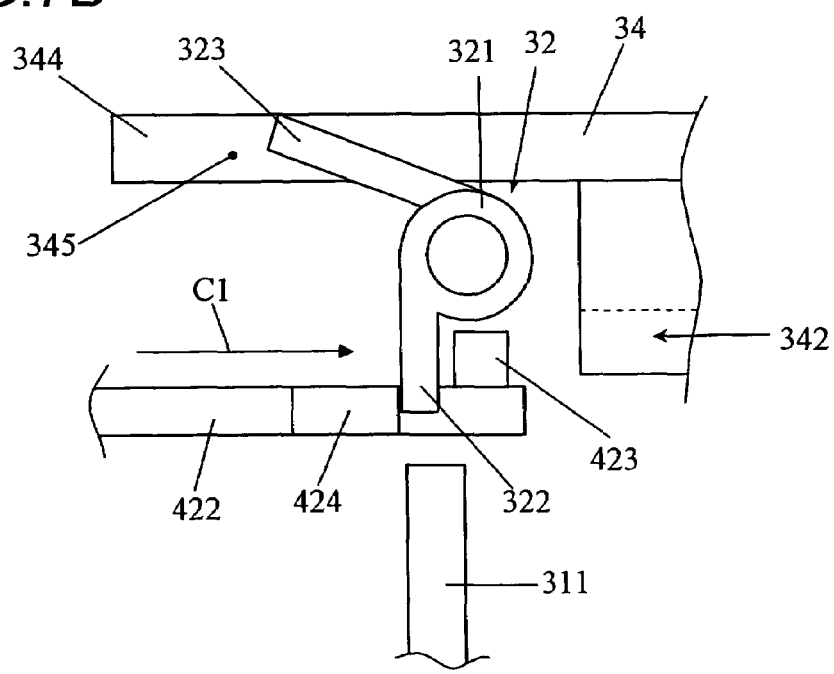
FIG. 7B is an enlarged side view schematically showing how the sub rack and the cam slider engage with each other.
Figure 8A:
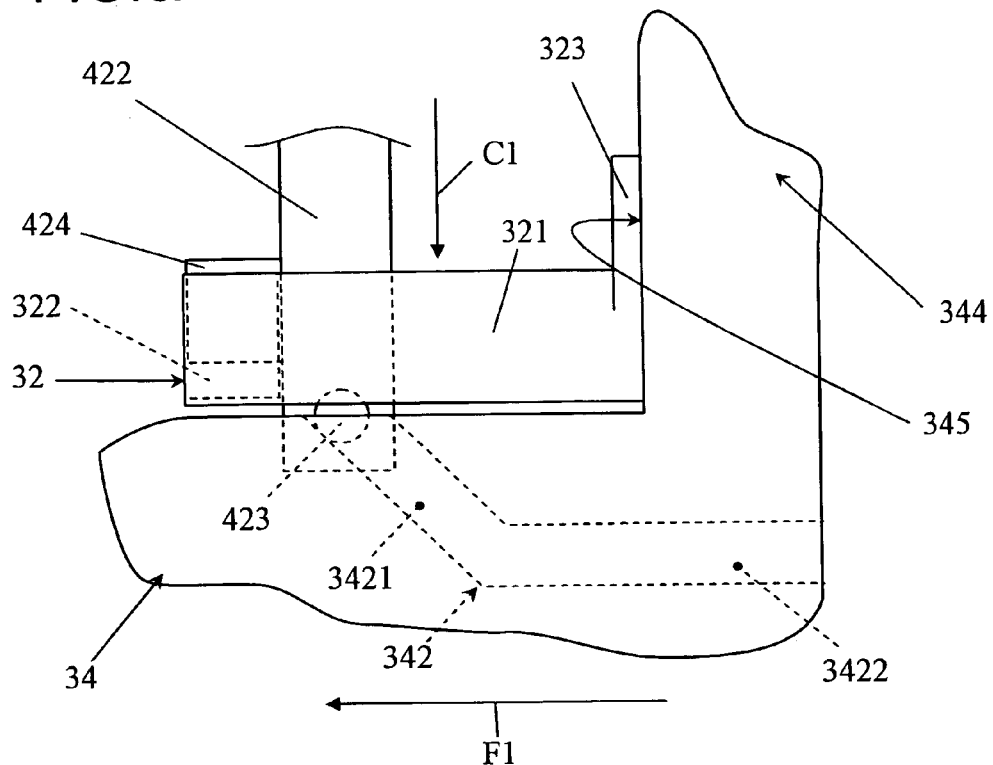
FIG. 8A is an enlarged plan view schematically showing how the sub rack and the cam slider, engaged with each other, move in a coordinated manner.
Figure 8B:
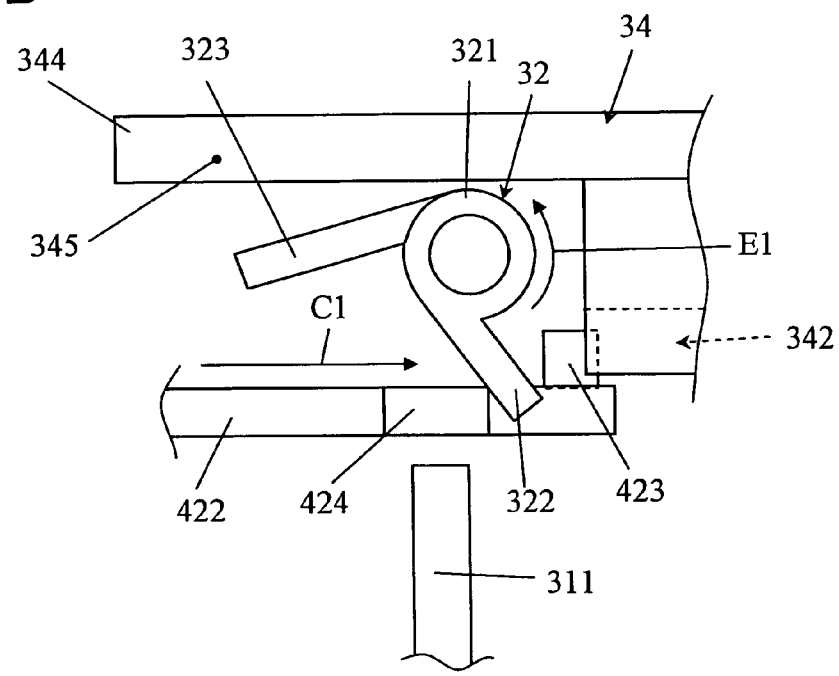
FIG. 8B is an enlarged side view schematically showing how the sub rack and the cam slider, engaged with each other, move in a coordinated manner.
Figure 9A:
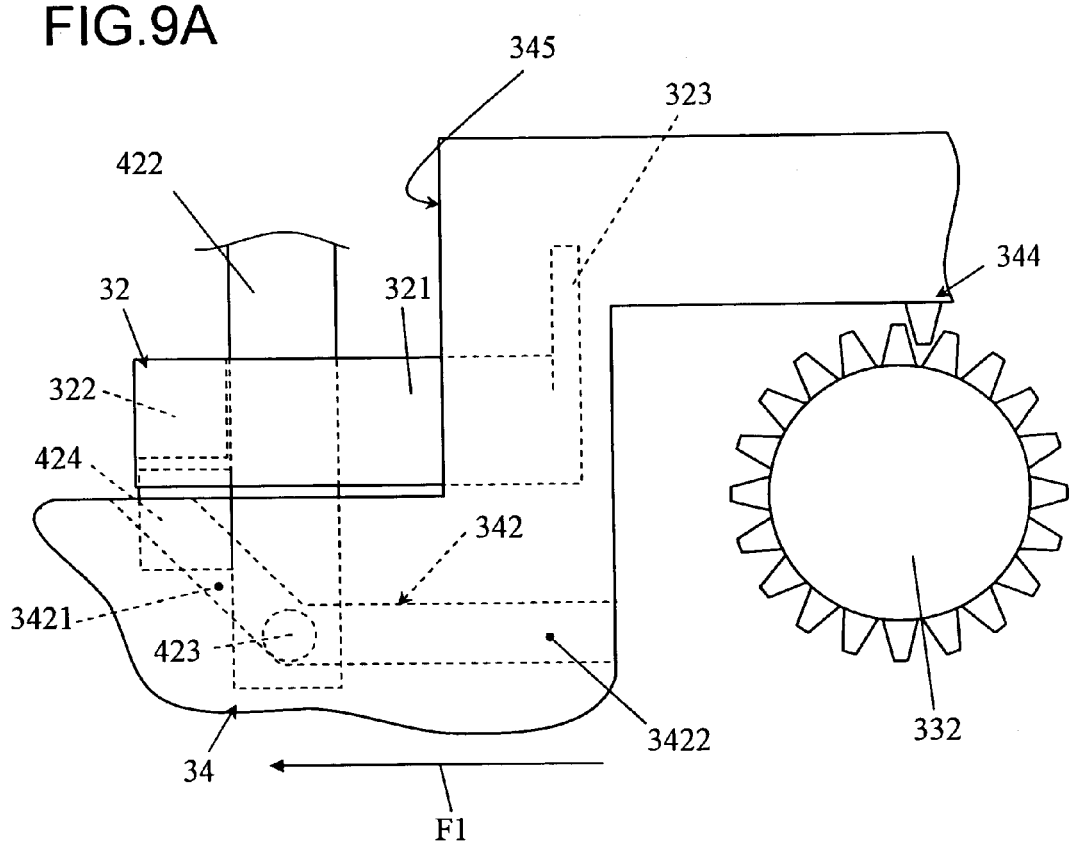
FIG. 9A is an enlarged plan view schematically showing how the cam slider meshes with the tray gear.
Figure 9B:
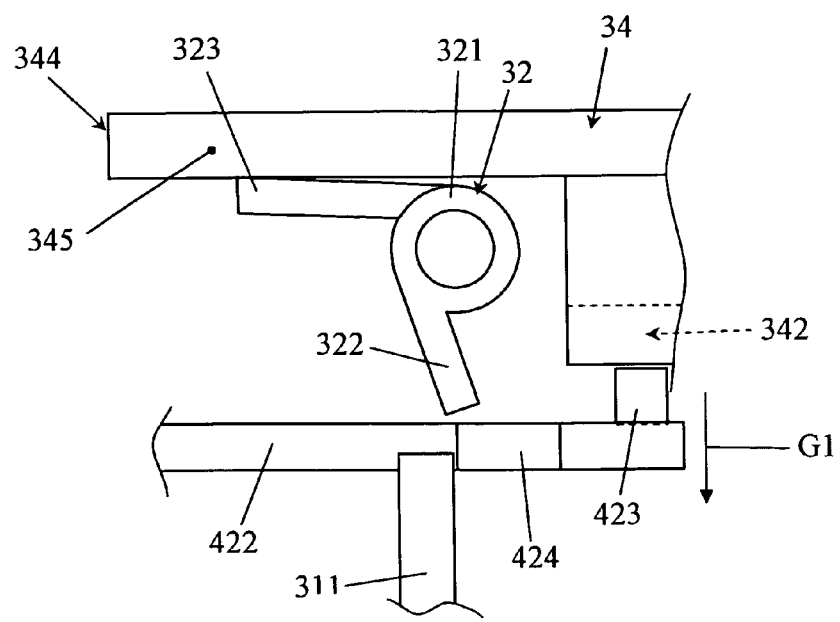
FIG. 9B is an enlarged side view schematically showing how the cam slider meshes with the tray gear.

FIGS. 7A and 7B are an enlarged plan view and an enlarged side view, respectively, schematically showing how the sub rack and the cam slider engage with each other. FIGS. 8A and 8B are an enlarged plan view and an enlarged side view, respectively, schematically showing how the sub rack and the cam slider, engaged with each other, move in a coordinated manner. FIGS. 9A and 9B are an enlarged plan view and an enlarged side view, respectively, schematically showing how the cam slider meshes with the tray gear.

As shown in FIG. 7B etc., as observed when the traverse unit 2 is in the stand-by position, the main chassis 31 includes a latch portion 311 that engages with the projection portion 424 formed on the sub rack 422 and a stopper member 32 that restricts the movement of the cam slider 34. The latch portion 311 protrudes from a bottom part of the main chassis 31, and has the shape of a laterally extending rectangular parallelepiped. In FIG. 2, when the optical head 4 moves to the front side and the traverse unit 2 is in the stand-by position, as shown in FIG. 9, the projection portion 424 formed on the sub rack 422 engages with the latch portion 311 and thereby restricts the movement of the optical head 4. When the traverse unit 2 moves to the clamping position, the latch portion 311 and the sub rack 422 disengage from each other, enabling the optical head 4 to move.

As shown in FIGS. 7A, 7B, etc., the stopper member 32 has a rotary shaft 321 in the shape of a circular column, a lever portion 322 that makes contact with the projection portion 424 formed on the sub rack 422, and a lock portion 323 that makes contact with the cam slider 34 to restrict the cam slider 34. The rotary shaft 321, the lever portion 322, and the lock portion 323 are, though not limited to be, formed integrally, and are, as shown in FIG. 7A, arranged at different positions along the axis of the rotary shaft 321. Moreover, as shown in FIG. 7B, as seen along the axis, the lever portion 322 and the lock portion 323 are formed to extend along different tangent lines.

The stopper member 32 is arranged on the main chassis 31 (see FIG. 2) so as to be rotatable. Here, the stopper member 32 rotates about the rotary shaft 321, which is arranged to extend laterally. The stopper member 32 is, though not limited to be, fitted with a resilient spring (unillustrated), and is thereby resiliently biased in such a way that, when the stopper member 32 is arranged on the main chassis 31, the upper part of the rotary shaft 321 rotates toward the front side.

Movement of the Movable Components

Now, the movement of each of the movable components (the optical head 4, the traverse unit 2, and the disc tray 1) will be described with reference to FIGS. 1 to 13, in particular FIGS. 7A to 13. In FIGS. 10 to 13, a "solid line" represents mechanical fixing (for example, by press-fitting or fasting with screws), a "dash-and-dot line" represents meshing of gear teeth. Moreover, a "double solid line" represents engagement with a cam, and a "broken line" represents isolation. The components contributing to the process of movement or switching depicted in each figure are hatched with slanted lines.

Figure 10:
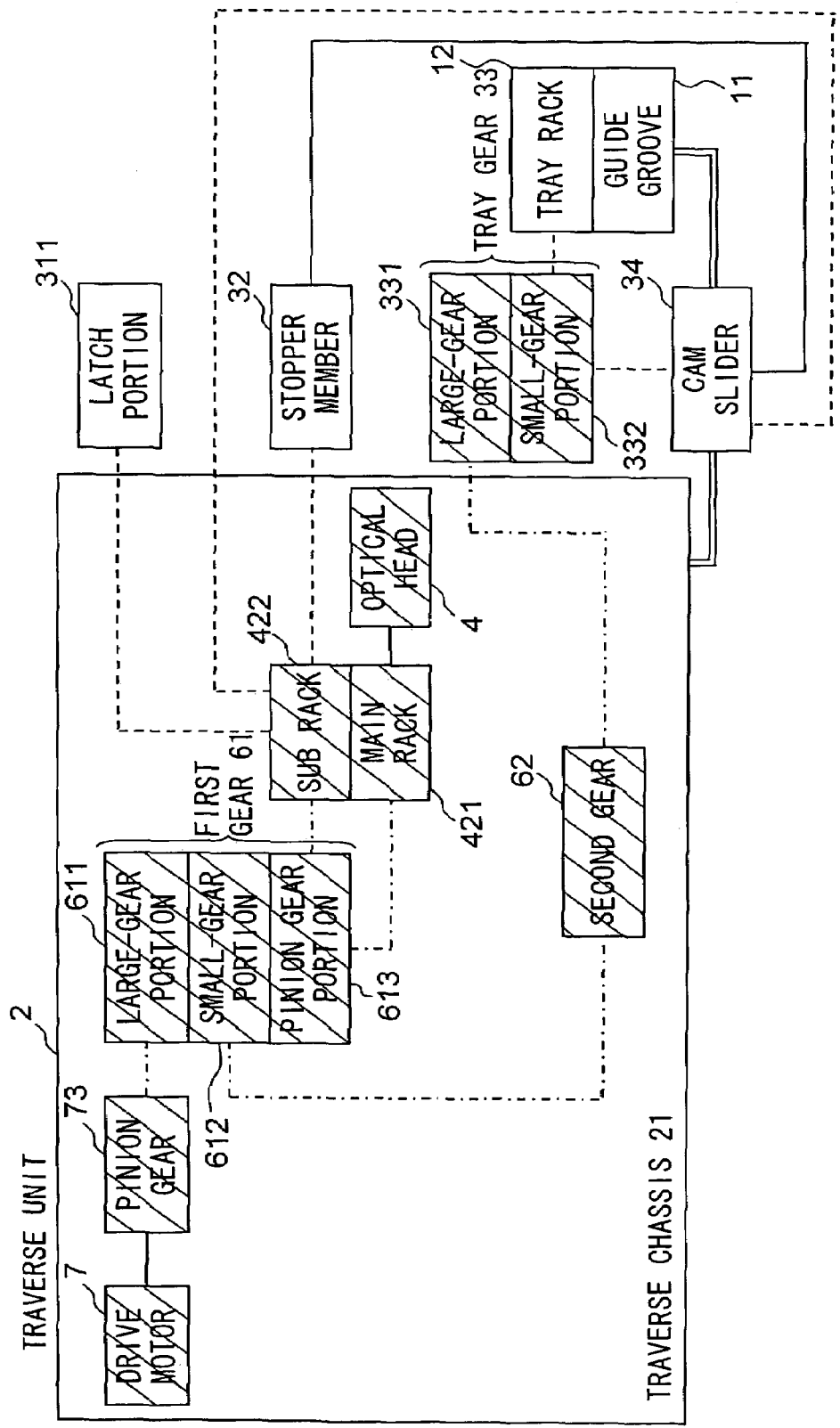
FIG. 10 is a block diagram illustrating the movement of the optical head.

Movement of the Optical Head (FIG. 10)

The movement of the optical head 4 in the optical disc apparatus A embodying the present invention will be described below. Consider, for example, a case where, on completion of playback etc. from an optical disc such as a DVD, the optical disc is going to be taken (unloaded) out of the optical disc apparatus A, that is, the disc tray 1 is going to be opened. As the traverse unit 2 moves, the optical head 4 retracts to the innermost side with respect to the optical disc (to the front side of the optical disc apparatus A).

When the traverse unit 2 shown in FIG. 2 is in the clamping position and thus the optical disc is clamped by the optical disc drive mechanism 5, as shown in FIGS. 7A and 7B, the lock portion 323 of the stopper member 32 is located in a high position, and the lock portion 323 makes contact with a lateral end 345 of the cam slider rack 344 of the cam slider 34, thereby preventing the movement of the cam slider 34. Restricting the movement of the cam slider 34 in this way prevents the cam slider rack 344 from meshing with the tray gear 33, and thus prevents the cam slider 34 from moving unexpectedly, thereby preventing the traverse unit 2 from moving.

In FIG. 3, first, the drive motor 7 rotates in direction A1 (in the forward direction), and this causes the pinion gear 73 to rotate in direction A1 together. Then, the large-gear portion 611 of the first gear 61, which is meshed with the pinion gear 73, rotates in direction B1. Now, the pinion gear portion 613, which is joined to (jointly formed with) the large-gear portion 611, also rotates in direction B1, and thus the rack 42 (the main rack 421 and the sub rack 422), which is meshed with the pinion gear portion 613, moves in direction C1. As the rack 42 moves, the optical head 4, on which the rack 42 is provided, also moves in direction C1.

In FIG. 3, the pinion gear 73 and the large-gear portion 611 of the first gear 61 are meshed with each other all the time, so are the small-gear portion 612 of the first gear 61 and the second gear 62, and so are the second gear 62 and the large-gear portion 331 of the tray gear 33. Accordingly, the large-gear portion 331 of the tray gear 33 receives the drive force from the drive motor 7 all the time, and thus the tray gear 33 rotates in direction D1. Here, the lateral end 345 of the cam slider rack 344 is in contact with the lock portion 323 of the stopper member 32, and thereby restricts the movement of the cam slider 34. On the other hand, the cam slider rack 344 is not meshed with the small-gear portion 332 of the tray gear 33, and thus the cam slider 34 remains motionless.

Figure 11:
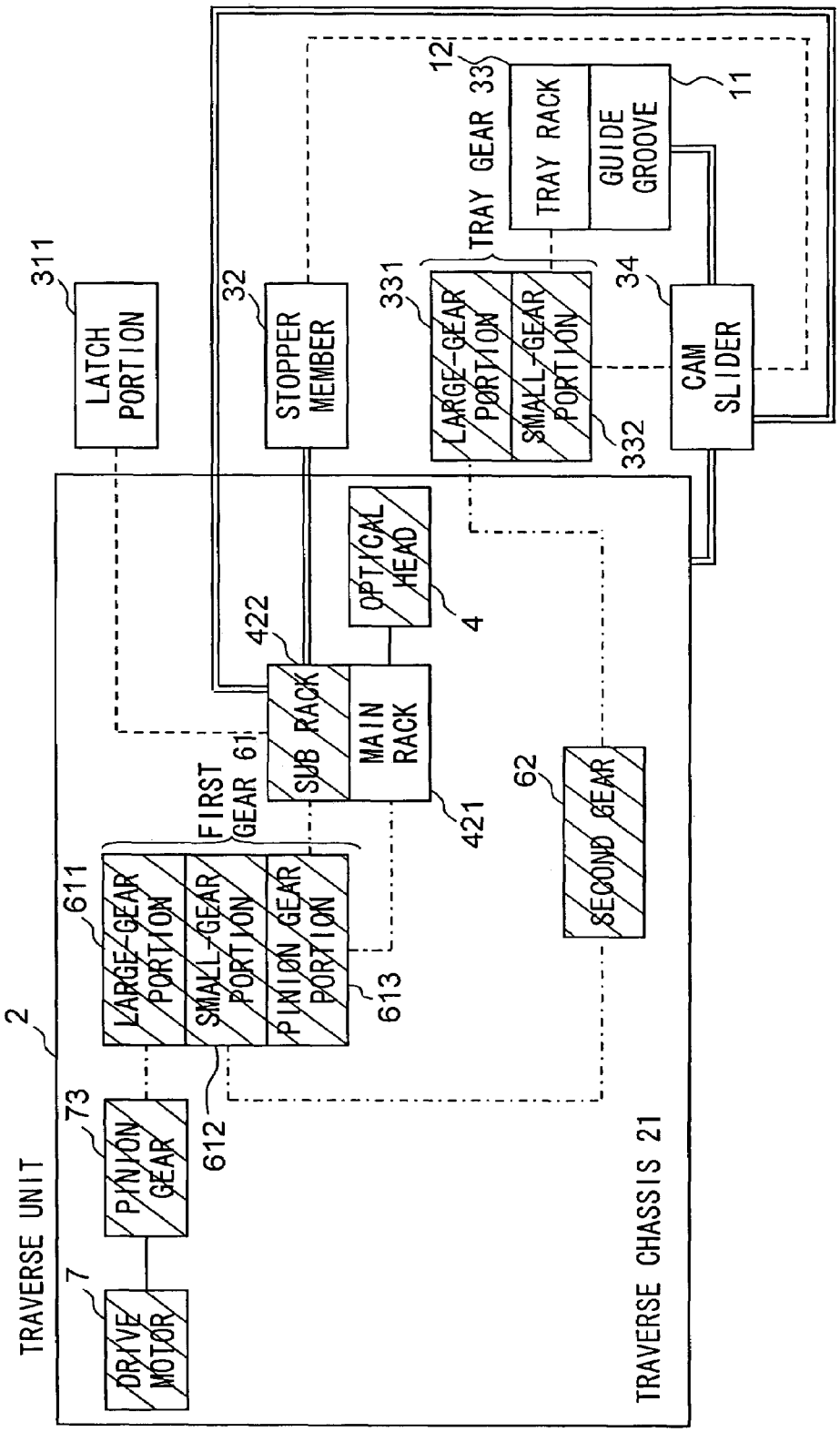
FIG. 11 is a block diagram illustrating the switching from the movement of the optical head to the movement of the traverse unit.

Switching from the Driving of the Optical Disc to the Movement of the Traverse Unit (FIG. 11)

In FIG. 3, when the optical head 4 reaches a predetermined position at the inner edge (front side) of the optical disc, the main rack 421 of the rack 42 and the small-gear portion 612 of the first gear 61 unmesh from each other, and instead the sub rack 422 and the small-gear portion 612 of the first gear 61 mesh with each other. As driving further continues, the sub rack 422 alone moves toward the front side.

As the sub rack 422 moves further toward the front side, as shown in FIGS. 8A and 8B, the projection portion 424 formed on the sub rack 422 pushes the lever portion 322 of the stopper member 32, and makes the stopper member 32 rotate in direction E1. As the stopper member 32 rotates, the lock portion 323 rotates and moves off the side surface of the cam slider rack 344. This enables the cam slider 34 to move.

About the same time that the stopper member 32 rotates, the rack boss 423 protruding from the sub rack 422 engages with the trigger guide 342. Thus, the sub rack 422 moves, and pushes the trigger guide 342. As a result, in FIG. 3, the cam slider 34 moves in direction F1, the cam slider rack 344 and the small-gear portion 332 of the large-gear portion 331 mesh with each other, the drive force of the tray gear 33 is transmitted to the cam slider rack 344, and thus the cam slider 34 moves further in direction F1.

As shown in FIG. 8A, as the cam slider 34 moves in direction F1, the rack boss 423, pushed by the oblique portion 3421 of the trigger guide 342, moves in direction C1 (toward the front side). Thus, in FIG. 3, the sub rack 422 and the pinion gear portion 613 of the first gear 61 unmesh from each other. As the cam slider 34 moves further in direction F1, as shown in FIG. 9A, the rack boss 423 moves to the lateral portion 3422, and restricts the movement of the sub rack 422 toward the rear side. That is, in FIG. 3, the main rack 421 and the pinion gear portion 613 unmesh from each other, and then the sub rack 422 moves further toward the front side. Thus, the cam slider 34 starts to move, and the sub rack 422 and the pinion gear portion 613 unmesh from each other, bringing the optical head 4 to a complete halt.

Figure 12:
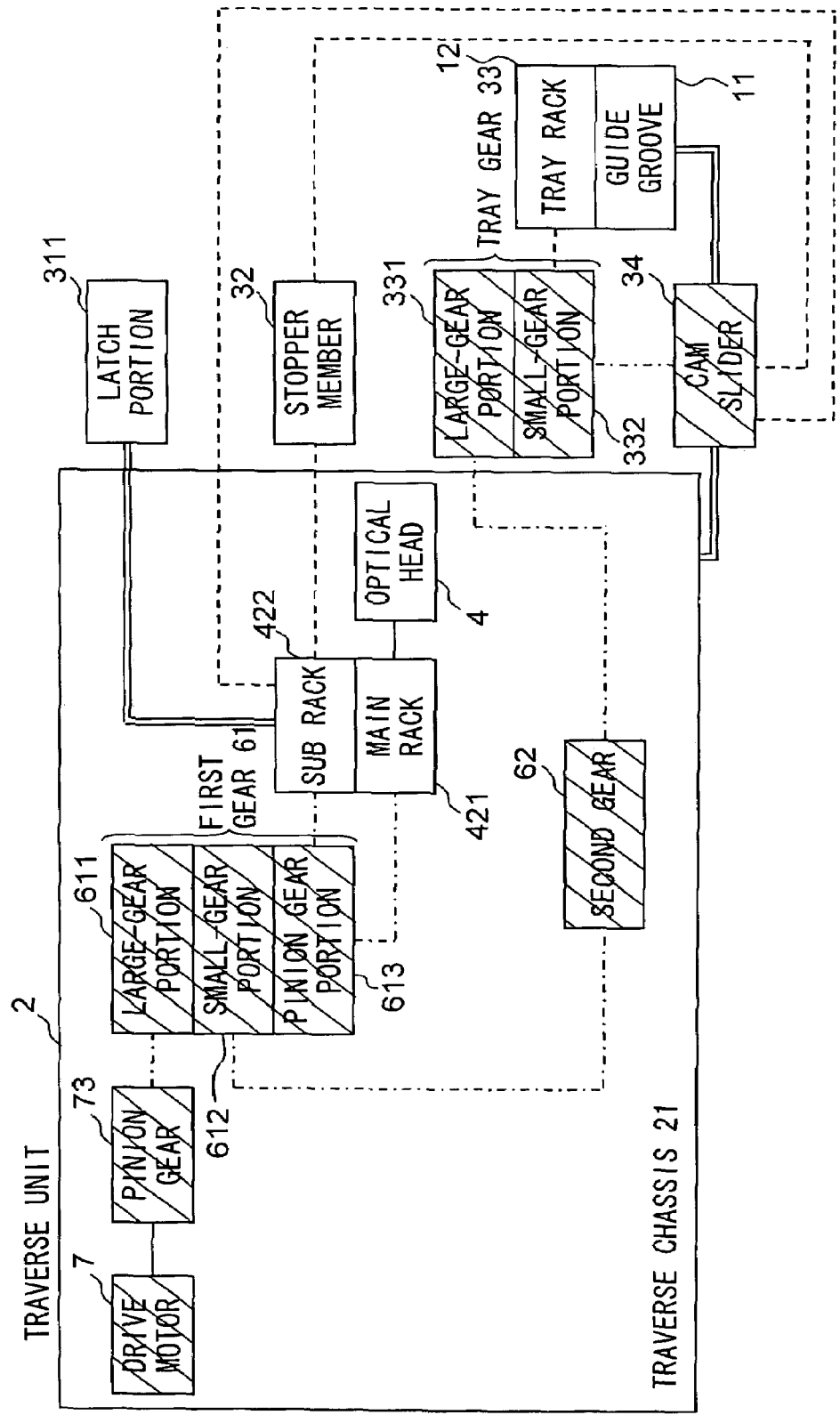
FIG. 12 is a block diagram illustrating the movement of the traverse unit.

Movement (Lowering) of the Traverse Unit to the Stand-by Position (FIG. 12)

In FIG. 3, when the small-gear portion 332 of the tray gear 33 and the cam slider rack 344 mesh with each other, the drive force of the drive motor 7 is transmitted by the drive force transmission mechanism 6 to the cam slider rack 344. This makes the cam slider 34 move away from the tray gear 33 (in direction F1).

As shown in FIG. 5, through the cam groove 343 of the cam slider 34 is placed the slide boss 212 of the traverse chassis 21. Thus, as the cam slider 34 moves, the slide boss 212 moves along inside the upper cam groove 3431, then along inside the inclined cam groove 3433, and then along inside the lower cam groove 3432. As the slide boss 212 moves in this way, the traverse chassis 21 moves down in direction G1. As a result, the traverse chassis 21, and hence the traverse unit 2, moves down. The sub rack 422 of the optical head 4 protrudes from a front-side end part of the traverse chassis 21.

As shown in FIGS. 9A and 9B, when the cam slider 34, receiving the drive force transmitted from the tray gear 33, starts to move, the rack boss 423 formed on the sub rack 422 is engaged with the lateral portion 3422 of the trigger guide 342. As the cam slider 34 moves and the traverse unit 2 moves down in direction G1, the rack boss 423 and the lateral portion 3422 of the trigger guide 342 disengage from each other. At this point, the projection portion 424 formed on the sub rack 422 engages with the latch portion 311 protruding from the bottom surface of the main chassis 31, and restricts the movement of the sub rack 422 and the optical head 4 toward the rear side.

Figure 13:
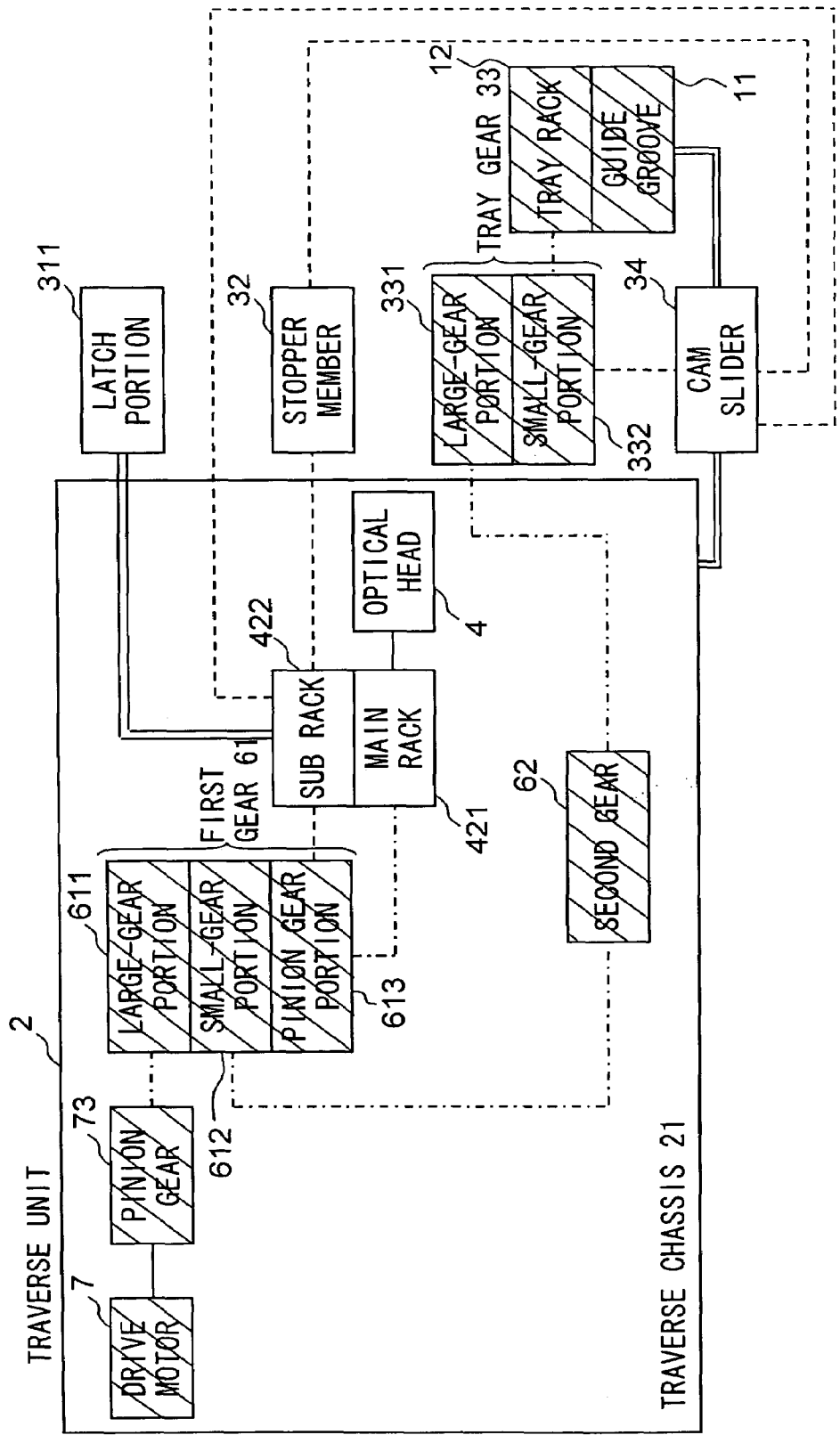
FIG. 13 is a block diagram illustrating the switching from the movement of the traverse unit to the movement of the disc tray.

Switching from the Movement of the Traverse Unit to the Movement of the Disc Tray (FIG. 13)

As shown in FIG. 3, until the traverse unit 2 (see FIG. 2) reaches the stand-by position, the vertical boss 341 of the cam slider 34 remains engaged with the perpendicular portion 113 of the guide groove 11, and, as the cam slider 34 moves in direction F1, the vertical boss 341 moves along inside the perpendicular portion 113 in direction F1. About the same time that the traverse unit 2 reaches the stand-by position, the vertical boss 341 reaches the junction between the perpendicular portion 113 and the oblique portion 112 of the guide groove 11. Even after the traverse unit 2 has moved down to the stand-by position, the cam slider 34 slides further in direction F1 until an end of the lower cam groove 3432 (see FIG. 5) comes close to or makes contact with the slide boss 212.

In FIG. 3, as the cam slider 34 moves in direction F1, the vertical boss 341 pushes the oblique portion 112 (see FIG. 4) of the guide groove 11. When the oblique portion 112 is pushed, the disc tray 1 moves in direction H1 (toward the front side). As the disc tray 1, pushed by the vertical boss 341, moves in direction H1, the tray rack 12 moves together, and meshes with the small-gear portion 332 of the tray gear 33. At the same time that that the tray rack 12 and the small-gear portion 332 of the tray gear 33 mesh with each other, the cam slider rack 344 of the cam slider 34 and the small-gear portion 332 of the tray gear 33 unmesh from each other.

Movement (Opening) of the Disc Tray (FIG. 13)

In FIG. 3, when the tray rack 12 and the tray gear 33 mesh with each other, as the tray gear 33 rotates in direction D1, the tray rack 12 moves indirection H1. That is, in FIG. 1, the disc tray 1 moves toward the front side, and is ejected through the slit-like opening St in the front panel Fp. Here, the vertical boss 341 of the cam slider 34 is engaged with the linear portion 111 (see FIG. 4) of the guide groove 11, and thereby restricts the lateral movement of the cam slider 34. Restricting the movement of the cam slider 34 in this way prevents the cam slider rack 344 from meshing with the tray gear 33 unexpectedly in response to shock or vibration, and thus prevents malfunctioning of the traverse unit 2, thereby allowing the optical disc to be unloaded safely.

As described above, in the optical disc apparatus A, the optical head 4, the traverse unit 2, and the disc tray 1 can operate with the rotation of a single drive motor 7. The example described above deals with a sequence of actions that achieves the movement of the optical head 4 to the inner edge, the downward movement of the traverse unit 2, and the opening of the disc tray 1. It should, however, be understood that, in FIG. 3, by rotating the drive motor 7 in the direction opposite to A1 (in the reverse direction), the relevant members can be rotated or moved in the directions opposite to B1 to H1, respectively. This makes it possible to perform a sequence of actions that achieves the movement of the optical head 4 to the outer edge, the upward movement of the traverse unit 2, and the closing of the disc tray 1.

In the construction described above, the stopper member 32 has been described, as an example, as being fitted with a spring. Here, instead of the spring, any other member may be used that exerts a resilient force. Alternatively, the center of gravity of the stopper member 32 may be so adjusted that, when the stopper member 32 is rotatably supported, the lock portion 323 rests in a higher position (for example, with the stopper member 32 shown in FIGS. 7 etc., by forming the lever portion 322 heavier). By resiliently biasing the stopper member by adjusting the center of gravity thereof in this way, it is possible to eliminate the need for a member dedicated to resilient biasing and thus to omit such a member.

What is claimed is:

1. An optical disc apparatus comprising:
    a main chassis;
    a disc tray that slides in a reciprocating fashion with respect to the main chassis to admit and eject an optical disc;
    a traverse chassis that is supported on the main chassis so as to be movable up and down;
    an optical head that is arranged on the traverse chassis so as to be slidable and that records data to or plays back data from the optical disc by irradiating the optical disc with laser light; and
    a drive motor that is fixed to the main chassis and that generates a drive force,
    wherein the optical head
        slides in a reciprocating fashion between an inner edge and an outer edge of the optical disc, and
        has a slide rack that receives the drive force of the drive motor,
    the slide rack having
        a rack boss that protrudes from a top surface of the slide rack and
        a projection portion that protrudes from a surface perpendicular to the top surface,
    wherein the traverse chassis has a slide boss that protrudes from a front surface thereof,
    wherein the main chassis has
        a tray gear that transmits the drive force,
        a cam slider having
            a cam slider rack that meshes with the tray gear,
            a cam groove that has a step that engages with the slide boss of the traverse chassis, and
            a trigger guide that engages with the rack boss of the slide rack,
        the cam slider sliding in a direction perpendicular to a slide direction of the disc tray,
        a stopper member having
            a rotary shaft that is supported to be rotatable and
            a lever portion and a lock portion that are arranged away from each other in an axial direction of the rotary shaft and that extend in different directions, and
        a latch portion that protrudes from a bottom part of the main chassis,
    wherein, as the cam slider slides, the slide boss slides along inside the cam groove of the cam slider, so that the traverse chassis moves up and down between
        a clamping position where the traverse chassis clamps the optical disc admitted by the disc tray and
        a stand-by position where the traverse chassis does not interfere with sliding movement of the disc tray, and
    when the traverse chassis moves down to the stand-by position, the projection portion of the optical head engages with the latch portion of the main chassis, and
    wherein the stopper member is resiliently biased in such a direction that the lock portion makes contact with the cam slider and, as the optical head slides toward an inner edge side of the optical disc, the lever portion rotates by being pushed by the projection portion, the stopper member moving between a locking position where the lock portion makes contact with a side surface of the cam slider to restrict sliding movement of the cam slider and an unlocking position where the lock portion leaves the cam slider free to slide.

2. The optical disc apparatus according to claim 1, wherein the stopper member has a spring member and is resiliently biased by the spring member.

3. The optical disc apparatus according to claim 1, wherein a center of gravity of the stopper member is adjusted such that the lock member rotates in such a direction as to make contact with the cam slider.

4. An optical disc apparatus comprising:

a main chassis;

a disc tray that slides in a reciprocating fashion with respect to the main chassis to admit and eject an optical disc;

a traverse chassis that is supported on the main chassis so as to be movable up and down;

an optical head that is arranged on the traverse chassis so as to be slidable and that records data to or plays back data from the optical disc by irradiating the optical disc with laser light; and a drive motor that is fixed to the main chassis and that generates a drive force for making the disc tray slide, for making the optical head slide, and for making the traverse chassis move up and down, wherein the disc tray has, on a bottom surface thereof,
  a tray rack that receives the drive force of the drive motor and
  a guide groove that serves as a coordinating mechanism,
wherein the optical head
  slides in a reciprocating fashion between an inner edge and an outer edge of the optical disc, and
  has a slide rack that receives the drive force of the drive motor,
  the slide rack having
    a rack boss that protrudes from a top surface of the slide rack and
    a projection portion that protrudes from a surface opposite to a rack,
wherein the traverse chassis has
  a slide boss that integrally protrudes from a front surface thereof,
  an optical disc drive mechanism that clamps the optical disc and that makes the optical disc rotate,
  a first gear having, joined together coaxially side by side in an axial direction,
    a large-gear portion that meshes with a pinion gear fitted to an output shaft of the drive motor,
    a small-gear portion, and
    a pinion-gear portion that meshes with the slide rack,
  the first gear being pivoted on the traverse chassis, and
  a second gear that is pivoted on the traverse chassis and that meshes with the small-gear portion of the first gear,
wherein the main chassis has
  a tray gear that is pivoted on the main chassis, that meshes with the second gear, and that meshes with the tray rack,
  a cam slider having
    a cam slider rack that is supported on the main chassis so as to be slidable and that meshes with the tray gear,
    a cam groove that engages with the slide boss of the traverse chassis and that has a groove having a step formed therein,
    a vertical boss that engages with the guide groove of the disc tray, and
    a trigger guide that engages with the latch boss of the slide rack and that has a bent shape,
  the cam slider sliding in a direction perpendicular to a slide direction of the disc tray,
  a stopper member having
    a rotary shaft that is pivoted on the main chassis so as to be rotatable,
    a resiliently biased member that resiliently biases the rotary shaft in a circumferential direction, and
    a lever portion and a lock portion that are arranged away from each other in an axial direction of the rotary shaft and that extend in different tangential directions, and
  a latch portion that protrudes from a bottom part of the main chassis and that engages with the projection portion,
wherein, as the cam slider slides, the traverse chassis moves up and down between
  a clamping position where the optical disc drive mechanism clamps the optical disc admitted by the disc tray and
  a stand-by position where the traverse chassis does not interfere with sliding movement of the disc tray,
wherein the stopper member is resiliently biased by the resiliently biasing member so as to rotate in such a direction that the lock portion makes contact with the cam slider, the stopper member is resiliently biased in such a direction that the lock portion makes contact with the cam slider, so that the stopper member moves between
  a locking position where the lock portion makes contact with a side surface of the cam slider to restrict sliding movement of the cam slider and
  an unlocking position to which, as the optical head slides toward the inner edge of the optical disc, the stopper member moves as a result of the lever portion rotating by being pushed by the projection portion and where the lock portion makes contact with a bottom surface of the cam slider to leave the cam slider free to slide, and
wherein, when the traverse chassis is in the clamping position, the stopper member is in the locking position and, as the traverse chassis moves to the stand-by position, the optical head moves toward the inner edge of the optical disc so that the projection portion of the slide rack pushes the lever portion to make the stopper member move to the unlocking position and the rack boss engages with and slides together with the trigger guide to make the cam slider such that the drive force is transmitted with a result that the traverse chassis moves down to make the projection portion engage with the latch portion and thereby restrict sliding movement of the optical head.

* * * * *